US012700078B2

(12) United States Patent (10) Patent No.: US 12,700,078 B2
Mahan (45) Date of Patent: Aug. 4, 2026

(54) ANOMALY DETECTION FOR COMPONENT USING POSE-DEPENDENT MACHINE LEARNING MODELS

(71) Applicant: Yokogawa Electric Corporation, Tokyo (JP)

(72) Inventor: Dakota Mahan, Carrollton, TX (US)

(73) Assignee: Yokogawa Electric Corporation, Tokyo (JP)

( * ) Notice: Subject to any disclaimer, the term of this patent is extended or adjusted under 35 U.S.C. 154(b) by 515 days.

(21) Appl. No.: 18/139,117

(22) Filed: Apr. 25, 2023

(65) Prior Publication Data

US 2024/0362763 A1 Oct. 31, 2024

(51) Int. Cl.
    *G06T 7/00* (2017.01)
    *G06T 7/70* (2017.01)
(52) U.S. Cl.
    CPC .............. *G06T 7/0004* (2013.01); *G06T 7/70* (2017.01); *G06T 2207/20081* (2013.01); *G06T 2207/20084* (2013.01); *G06T 2207/30244* (2013.01)
(58) Field of Classification Search
    None
    See application file for complete search history.

(56) References Cited

U.S. PATENT DOCUMENTS 10,572,993 B2 2/2020 Tanaka et al.
10,607,331 B1 3/2020 Tandia et al.

2020/0005422 A1* 1/2020 Subramanian ....... G06N 3/0464
2020/0175669 A1* 6/2020 Bian ..................... G06T 7/0004
2021/0310893 A1 10/2021 Li et al.
2021/0319546 A1* 10/2021 Kang ..................... G06N 20/20
2022/0383019 A1* 12/2022 Tremblay ............... G06V 40/11
2022/0388174 A1 12/2022 Stathis et al.
                    (Continued)

FOREIGN PATENT DOCUMENTS

CN      114926682      8/2022
EP      3968103        3/2022
GB      2542118        3/2017
                    (Continued)

OTHER PUBLICATIONS

Japan Patent Office; Second Office Action issued for Application No. 2024-070659, 8 pages, dated Aug. 19, 2025.
                    (Continued)

*Primary Examiner* — Leon Viet Q Nguyen
(74) *Attorney, Agent, or Firm* — Gray Ice Higdon

(57) ABSTRACT

Utilizing pose-dependent machine learning (ML) models in determining whether an anomaly is present within an environment. A first ML model is used to generate first output based on processing a first image, captured by a camera of a mobile robot, when the camera is at a first pose. The first ML model is used based on the first image being captured at the first pose and the first ML model being trained for the first pose. A second ML model is used to generate second output based on processing a second image that is captured, by the camera, when the camera is at a distinct second pose. The second ML model is used based on the second image being captured at the second pose and the second ML model being trained for the second pose. The first and second outputs can be used in determining whether an anomaly is present.

21 Claims, 4 Drawing Sheets

(56)     References Cited

U.S. PATENT DOCUMENTS

2024/0005472 A1*   1/2024   Kopylov ............... G06T 7/0012

FOREIGN PATENT DOCUMENTS

| | | |
|---|---|---|
| JP | 2019087114 | 6/2019 |
| JP | 2020531014 | 11/2020 |
| JP | 2021165984 | 10/2021 |
| JP | 2023029227 | 3/2023 |

OTHER PUBLICATIONS

Japan Patent Office; First Office Action issued for Application No. 2024-070659, 8 pages, dated Jun. 3, 2025.
Japan Patent Office; Notice of Allowance issued for Application No. 2024-70659, 6 pages, dated Dec. 2, 2025.

* cited by examiner

300

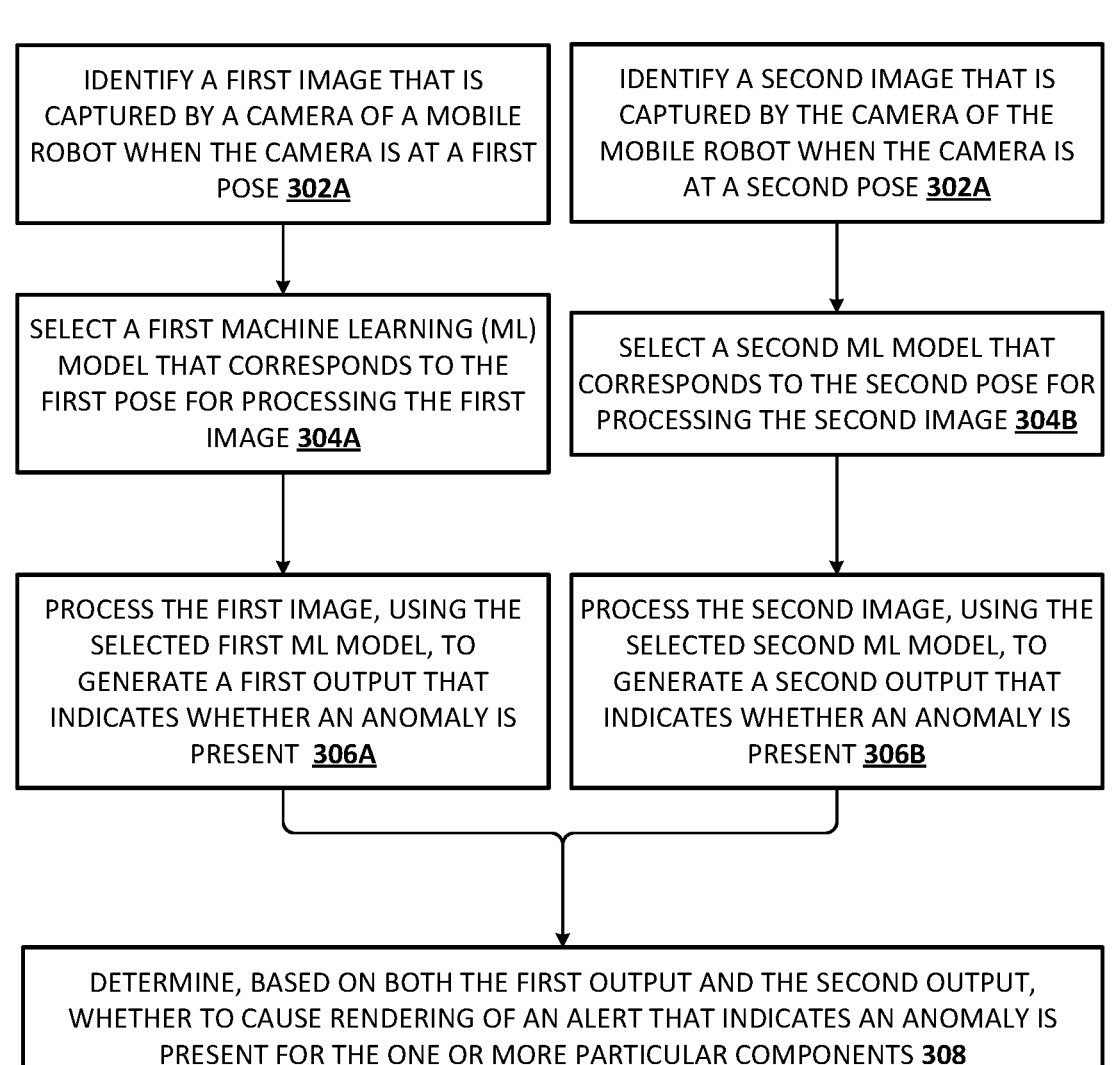

| IDENTIFY A FIRST IMAGE THAT IS CAPTURED BY A CAMERA OF A MOBILE ROBOT WHEN THE CAMERA IS AT A FIRST POSE 302A | IDENTIFY A SECOND IMAGE THAT IS CAPTURED BY THE CAMERA OF THE MOBILE ROBOT WHEN THE CAMERA IS AT A SECOND POSE 302A |

| SELECT A FIRST MACHINE LEARNING (ML) MODEL THAT CORRESPONDS TO THE FIRST POSE FOR PROCESSING THE FIRST IMAGE 304A | SELECT A SECOND ML MODEL THAT CORRESPONDS TO THE SECOND POSE FOR PROCESSING THE SECOND IMAGE 304B |

| PROCESS THE FIRST IMAGE, USING THE SELECTED FIRST ML MODEL, TO GENERATE A FIRST OUTPUT THAT INDICATES WHETHER AN ANOMALY IS PRESENT 306A | PROCESS THE SECOND IMAGE, USING THE SELECTED SECOND ML MODEL, TO GENERATE A SECOND OUTPUT THAT INDICATES WHETHER AN ANOMALY IS PRESENT 306B |

DETERMINE, BASED ON BOTH THE FIRST OUTPUT AND THE SECOND OUTPUT, WHETHER TO CAUSE RENDERING OF AN ALERT THAT INDICATES AN ANOMALY IS PRESENT FOR THE ONE OR MORE PARTICULAR COMPONENTS 308

*FIG. 3*

ANOMALY DETECTION FOR COMPONENT USING POSE-DEPENDENT MACHINE LEARNING MODELS

BACKGROUND

A complex industrial facility such as a petrochemical refinery, a chemical plant, etc., can include numerous components that are utilized in the processing of liquid(s), gas(es), and/or of other matter(s) involved in the industrial process(es) of the industrial facility. It is important to ensure that the components that are involved in the industrial process(es) are operating as intended and/or to ensure that matter(s) involved in the industrial process(es) are in their intended states.

Various sensors have been utilized in industrial facilities to monitor for anomalies in such component(s) and/or matter(s). Such sensors include temperature sensors utilized to monitor for temperature anomalies in component(s) and/or matter(s), optical sensors utilized to monitor for anomalies in compositions of matter(s) (e.g., based on exciting those matter(s) with a light source), etc.

While various sensors can be utilized in an industrial facility to monitor for various anomalies, such sensors are each typically deployed in a corresponding fixed location within the industrial facility. Accordingly, a very large quantity of sensors may be needed to effectively monitor an industrial facility. Further, providing power and/or communication to each of the sensors can require extensive wiring throughout the industrial facility. Yet further, the large quantity of sensors are each subject to failure or malfunction and must be serviced and/or replaced when that occurs-which can be difficult in a large industrial facility that includes a large quantity of fixed sensors.

SUMMARY

Implementations of the present disclosure are directed to utilizing a mobile robot to capture, via a camera of the mobile robot and at a given pose, an image of component(s) and/or matter(s) in an environment, such as in an industrial facility or other environment. Those implementations are further directed to processing the captured image, using a machine learning (ML) model that corresponds to the given pose, to generate ML output. The machine learning model can be a neural network model, such as a convolutional neural network (CNN) model that includes one or more convolutional layers. The image is processed using the ML model in response to the image being captured at the given pose and in response to the ML model corresponding to the given pose at which the image was captured. Those implementations are further directed to determining, based on the generated ML output, whether there is an anomaly with the component(s) and/or matter(s) that are captured by the image and, if so, causing one or more remediating action(s) to be performed. Causing remediating action(s) to be performed can include, for example, causing alert(s) to be rendered, causing process(es) to be halted, and/or causing other remediating action(s) to be performed.

As referenced above, the image is processed using the ML model in response to the image being captured at the given pose and in response to the ML model also corresponding to the given pose at which the image was captured. For example, metadata can indicate that the image was captured at the given pose and the ML model can be selected, from among multiple candidate ML models, for processing the image based on the metadata indicating that the image was captured at the given pose and the ML model also corresponding to the given pose. The metadata can be included as data that is incorporated as part of the image or as data that is separate from, but associated with, the image. The metadata can reflect, directly or indirectly, a given position and/or a given orientation at which the image was captured. The given position and/or the given orientation, that is reflected by the metadata, can be with respect to a world frame, such as a relative world frame. Put another way, the given pose can be with respect to some absolute or relative world frame, as opposed to only being with respect to the mobile robot. For example, if the camera that captures the image is non-adjustably coupled to the robot (i.e., always at a fixed pose relative to the robot), the given pose will vary as the robot moves, despite the camera remaining at a fixed pose relative to the robot (due to its non-adjustable coupling).

The ML model can correspond to the given pose based on it being trained using ground truth images that were also captured at or near the given pose (e.g., within a threshold of the given pose). For example, the ML model can be trained based at least in part on negative training instances that each include training instance input of a corresponding image captured at or near the given pose when no anomalies were present, and labeled training instance output that indicates no anomalies were present. Also, for example, the ML model can additionally or alternatively be calibrated based at least in part on positive calibration instances that each include calibration instance input of a corresponding image captured at or near the given pose when an anomaly was present, and labeled calibration instance output that indicates an anomaly was present. The ML model can be indexed with, or otherwise associated with, data that indicates it corresponds to the given pose and/or pose(s) that are within a threshold of the given pose. For example, the ML model can be indexed with data that indicates the given pose based on it being trained for the given pose, and can be used for processing the image based on being indexed with such data and the image also being associated with metadata that indicates the given pose.

Notably, and as referenced above, multiple candidate ML models can be provided and each of the candidate ML models can correspond to a different corresponding pose. For example, a first ML model can correspond to a first pose based on being trained based on images captured at or near the first pose, a second ML model can correspond to a second pose based on being trained based on images captured at or near the second pose, etc. For instance, the first ML model can be trained exclusively based on images captured at or near the first pose, the second ML model can be trained exclusively based on images captured at or near the second pose, etc. Also, for instance, the first ML model can be a given model that has been fine-tuned based on images captured at or near the first pose, the second ML model can be the given ML model that has been fined-tuned based on images captured at or near the second pose, etc. For example, the first ML model can be fine-tuned based on training instances that each include a corresponding image captured at or near the first pose, and a corresponding supervised labeled output that indicates whether an anomaly is present in the corresponding image. For instance, the corresponding supervised labeled output can be based on input, from a human operator after reviewing the corresponding image, where the input indicates whether an anomaly is present in the image.

Accordingly, which of the multiple candidate ML models is utilized in processing a given image that is captured by the mobile robot can be dependent on a given pose at which the image was captured. For example, if the given image was captured at or near a first pose, a first ML model that corresponds to the first pose can be utilized. On the other hand, if the given image was instead captured at or near a second pose, a second ML model that corresponds to the second pose can be utilized. Accordingly, the ML model that is utilized in processing an image, to generate output for use determining whether an anomaly is present in component(s) and/or matter(s) captured by the image, can be selected in dependence on the pose of the image and can be selected based on the ML model being trained based on ground truth images that were also captured at or near the pose. Accordingly, the ML model that is utilized is adapted to the pose of the image, resulting in more accurate output when the image is processed using the ML model. The more accurate output can mitigate occurrences of false positive and/or false negative anomaly detections. Mitigating occurrences of false positives can, for example, prevent utilization of network and/or computing device resources in incorrectly causing remediating action(s) to be performed, such as causing false positive alarms to be rendered. Mitigating occurrences of false negatives can prevent occurrences of unsafe conditions in the industrial facility and/or damage to component(s) and/or matter(s) of the industrial facility.

In various implementations of the present disclosure, multiple ML models and images, each corresponding to a different respective pose, are utilized in determining whether an anomaly is present in given component(s) and/or matter (s). As an example, a first ML model can be trained using first ground truth images that capture a given liquid tank from at or near a first pose. That first ML model can be used to process a first image, that captures the given liquid tank from the first pose, to generate first output that indicates whether an anomaly associated with the given liquid tank is present (e.g., an anomaly with the given liquid tank itself and/or with a liquid contained thereby). Continuing with the example, a second ML model can be trained using second ground truth images that capture the same given liquid tank from at or near a distinct second pose. That second ML model can be used to process a second image, that capture the same given liquid tank from the distinct second pose, to generate second output that indicates whether an anomaly associated with the given liquid tank is present. Further, both the first output from the first ML model and the second output from the second ML model can be considered in determining whether there is an anomaly with the liquid tank. For example, an anomaly can be detected: (a) if the first model output satisfies a lower bound anomaly threshold and the second model output also satisfies a lower bound anomaly threshold; (b) if either of the first model output or the second model output satisfies an upper bound anomaly threshold; (c) and/or if an average (or other combination) of the first and second model outputs satisfies a threshold (e.g., a lower bound, upper bound, or other threshold).

By considering both the first output and the second output in determining whether there is an anomaly with the liquid tanks, occurrences of false positives and/or false positive can be mitigated. For example, it can be the case that the first image includes significant glare (e.g., from current sunlight conditions) and, as a result, the first output (standing alone) can indicate an anomaly despite there being no true anomaly with the liquid tank. However, the second image can include less (or no) glare and, as a result, the second output (standing alone) can indicate no anomaly. Considering both the first output and the second output in such a situation can result in a correct no anomaly determination, whereas considering only the first output in isolation would result in an incorrect anomaly determination. As another example, it can be the case that an anomaly can be detected when each of the first and second outputs satisfy a lower bound anomaly threshold and/or when a combination of the first and second outputs satisfies the lower bound anomaly threshold, and the lower bound anomaly threshold can be set more aggressively as a result of considering both the first and second outputs. Such more aggressive lower bound anomaly threshold can mitigate the occurrence of false negatives. Put another way, if only a single output were considered the lower bound anomaly threshold would have to be less aggressive (i.e., a higher lower bound) to prevent over-occurrence of false positives.

Many of the preceding examples describe a first ML model and second ML model being utilized in determining whether an anomaly is present in given component(s) and/or matter(s). However, it is noted that more than two ML models can be utilized, for given component(s) and/or matter(s), in various implementations.

The mobile robot that is utilized in capturing images from various poses can be a quadruped robot, a wheeled robot, an unmanned aerial vehicle, a track-guided robot, or any other robot that moves itself within the environment. The images are captured via a vision component of the mobile robot. Each image is captured when the vision component is at a corresponding pose (i.e., a given position and orientation). The pose of the vision component when an image is captured at a given time will be a function of the pose of the robot at the given time. When the vision component is at a fixed pose relative to the robot, the pose of the vision component will be purely a function of the pose of the robot. When the pose of the vision component pose is independently adjustable relative to the robot, the pose of the vision component will be a function of the pose of the robot and a pose of the vision component relative to the robot. Images that are utilized herein can include, for example: an RGB image that includes a red channel, a green channel, and a blue channel and that is captured by a monographic RGB camera; an RGB-D image that includes a depth channel in addition to red, green, and blue channels, and that is captured by a stereographic camera; or a thermal image that includes one or more thermal channels and that is captured by a thermal camera.

Through utilizing the mobile robot, that includes the vision component and that moves around within an environment and capture images of component(s) and/or matter (s) that are of interest for anomaly monitoring/detection, the number of sensors monitoring the environment can be reduced and/or extensive wiring needed for such sensors can be avoided. Moreover, by processing a respective image, of the one or more captured images of the component(s) and/or matter(s), that is captured at a given pose, using a pose-dependent ML model trained to process images corresponding to the given pose for anomaly detection, accuracy of anomaly detection based on processing the respective image can be improved. This enables anomaly detection to be more robust and/or more accurate.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example method for performing selected aspects of the present disclosure.

DETAILED DESCRIPTION

Implementations described herein pertain to monitoring for, and selectively detecting, anomalies for a component (e.g., a liquid tank, piping, wiring) within an environment (e.g., an industrial automation facility), using pose-dependent machine learning (ML) models. In various implementations, images of the component are captured by a vision component (e.g., camera) that is carried by, or integrated with, a mobile robot movable within the environment. The images are captured by the vision component at different poses (i.e., different positions and orientations), and ML models corresponding to those poses are selected to process the images. For example, a first image captured by the vision component at a first pose can be processed using a first ML model trained for anomaly detection based on images captured at or near the first pose, and a second image captured by the vision component at a second pose can be processed using a second ML model trained for anomaly detection based on images captured at or near the second pose. Based on processing of the images using the selected ML models (e.g., processing the first image using the first ML model and the second image using the second ML model), one or more anomalies (if any) associated with the component can be identified/detected, and one or more remediating actions can be performed to address the detected one or more anomalies.

Figure 1:
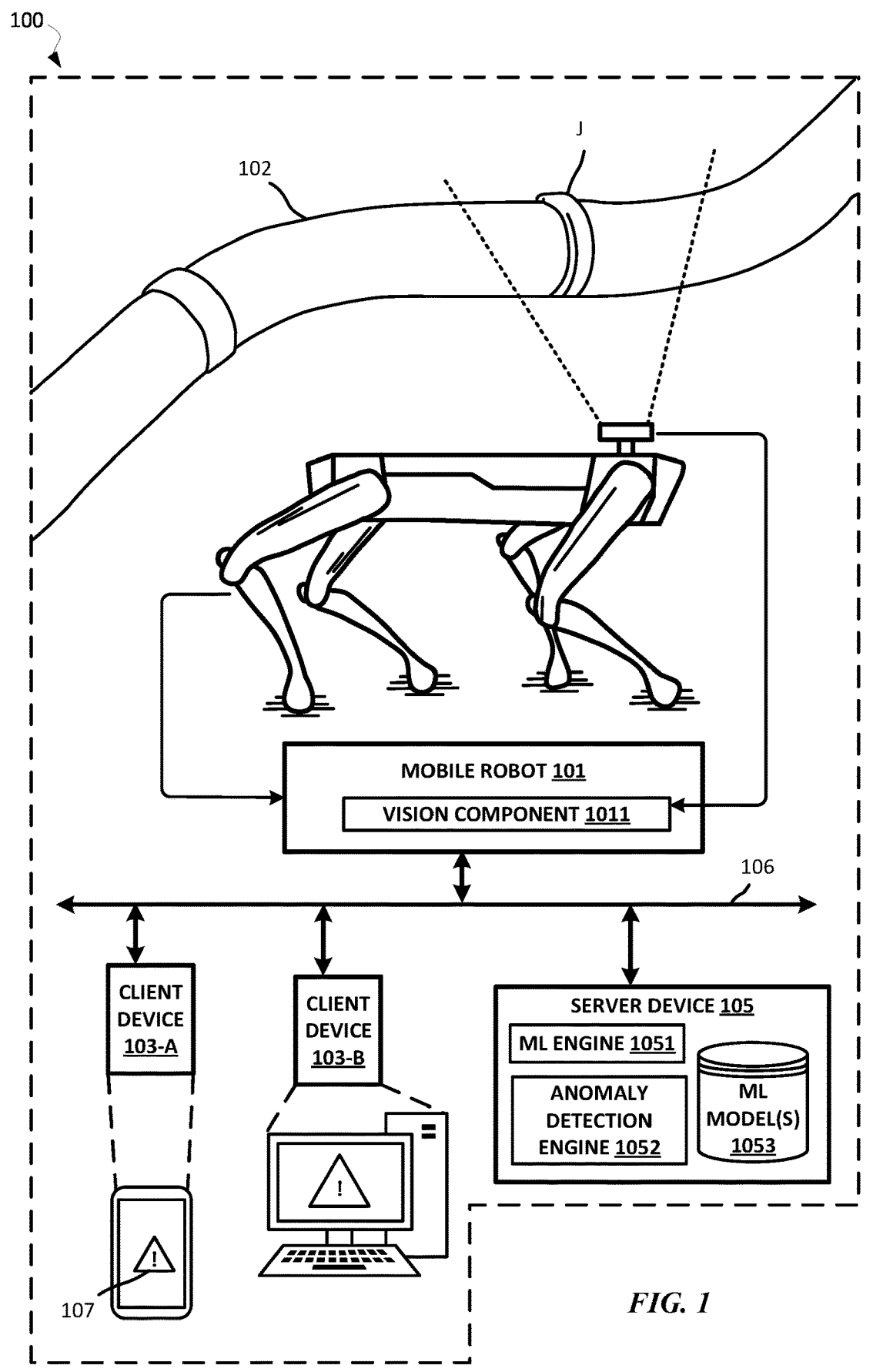
FIG. 1 schematically depicts an environment in which selected aspects of the present disclosure can be implemented, in accordance with various implementations.

Referring now to FIG. 1, an example environment 100 in which various aspects of the present disclosure may be implemented is depicted schematically. In some implementations, the example environment 100 can be, or can include, an industrial facility. The industrial facility can take numerous forms and can be designed to implement any number of at least partially automated processes. The industrial facility can take the form of a chemical processing plant, an oil or natural gas refinery, a catalyst factory, a manufacturing facility, an offshore oil platform, etc.

The example environment 100 can include one or more client devices (e.g. local client devices 103-A and 103-B) operably coupled with a process automation network 106 in the industrial facility. The client device 103-A or 103-B can be implemented as a computer (e.g., laptop, desktop, notebook), a tablet, a robot, a smart appliance (e.g., smart phone), a messaging device, a wearable device (e.g., watch), or any other applicable device. The process automation network 106 can be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh).

The example environment 100 can further include a mobile robot 101 having or carrying a vision component 1011. The mobile robot 101 can be a quadruped robot (e.g., a robot dog), a wheeled robot, an unmanned aerial vehicle, a robot that moves along elevated and/or non-elevated tracks within the environment, or any other applicable robot movable within the industrial facility. The vision component 1011 can be a monographic camera, a stereographic camera, a thermal camera, or any other applicable vision component, to capture one or more images of one or more particular components (e.g., a liquid tank or tube 102 storing or transporting a liquid matter) of the industrial facility. The vision component 1011 can be removably coupled to the mobile robot 101, or can be integrated as a non-removable cohesive part of the mobile robot 101. In some implementations, the vision component 1011 can change location and/or orientation independently with respect to a robot frame of the mobile robot 101, for example, by rotation or other movement via actuator(s) that independently control the vision component 1011. The mobile robot 101 can, in addition to the vision component 1011, include one or more additional vision components to navigate through the industrial facility, sense static or dynamic objects, and/or to capture images.

The example environment 100 can further include a server device 105. The server device 105 can include a machine learning (ML) engine 1051, and an anomaly detection engine 1052. The server device 105 can further include, or otherwise access, one or more pose-dependent machine learning (ML) models 1053. The server device 105 can be in communication with one or more local client devices (e.g., 122-A and 122-B), and/or be in communication with one or more remote client devices (not illustrated). The local client device 122-A or 122-B can be connected to the server device 105 via one or more local area networks (e.g., the process automation network 106), and the remote client device can be connected to the server device 105 via one or more wide area networks (e.g., the Internet). The local client device(s) and the remote client device(s) can be operable by personnel such as system integrators to configure and/or interact with various aspects of the example environment 100.

In some implementations, the server device 105 can, in addition to the ML engine 1051 and the anomaly detection engine 1052, include a database (not illustrated) that stores information used by the ML engine 1051 and/or the anomaly detection engine 1052 to practice selected aspects of the present disclosure. Various aspects of the server device 105, such as the ML engine 1051 and/or the anomaly detection engine 1052, can be implemented using any combination of hardware and software. In some implementations, the ML engine 1051, the anomaly detection engine 1052, or the one or more pose-dependent ML models 1053 can be implemented across multiple computer systems as part of what is often referred to as a "cloud infrastructure" or simply the "cloud." However, this is not required, and in FIG. 1, for instance, the ML engine 1051 is implemented within the industrial facility, e.g., in a single building or across a single campus of buildings or other industrial infrastructure. In such an implementation, the ML engine 1051 can be implemented on one or more local computing systems, such as on one or more local server computers.

In some implementations, the mobile robot 101 can navigate through the industrial facility and arrive at a designated spot or waypoint. The vision component 1011 of the mobile robot 101 can be configured at a given pose (position and/or orientation), to capture an image of the liquid tube 102 at the given pose. The vision component 1011 can be configured at the given pose as a result of the mobile robot 101 being at a corresponding pose and/or as a result of the vision component 1011 being independently adjusted (when the vision component 1011 is independently adjustable relative to a robot frame of the mobile robot 101). The image captured by the vision component 1011 can include pixels or other data that capture and correspond to an area of interest (e.g., a joint J as shown in FIG. 1, or a region at which a wet spot or crack was previously identified indicating potential leakage, etc.) for the liquid tube 102. Based on the given pose at which the image is captured by the vision component 1011 and/or based on a type of the captured image, the ML engine 1051 can select a pose-dependent ML model corresponding to the given pose, from the ML models 1053, for processing the captured image.

The captured image can be processed, by the ML engine 1051, as input to the selected pose-dependent ML model that corresponds to the given pose, to generate an ML output of the selected pose-dependent ML model. The ML output indicates whether the area of interest of the liquid tube 102 includes one or more anomalies. In some implementations, the pose-dependent ML model that corresponds to the given pose can be trained using training instances each including: (1) an image captured by the vision component (or an additional vision component) at the given pose (i.e., at a given location and given orientation) and (2) a ground truth label indicating whether an anomaly is present within the image (e.g., no anomaly is present, or one or more particular types of anomaly are present). For instance, the pose-dependent ML model that corresponds to the given pose can be trained using a plurality of training instances each including an image captured at the given pose and a ground truth label indicating whether an anomaly is present within the image captured at the given pose. In this instance, the aforementioned ML output can indicate whether the area of interest of the liquid tube 102 includes any anomaly. Training the pose-dependent ML model based on such training instances can include training the pose-dependent ML model on such training instances exclusively, or fine-tuning the pose-dependent ML model by training on such training instances, after initial training on non-pose-dependent training instances.

In some implementations, each ground truth label can be a single corresponding value, such as either an "anomaly present" label (e.g., "1") or a "no anomaly" label (e.g., "0"). In those implementations, the output generated, by processing an image using the ML model, will likewise generate a single corresponding value (e.g., a value from "0" to "1"), and that single value can indicate a corresponding likelihood of an anomaly being present. In some other implementations, each ground truth label can include multiple values, such as an "anomaly present" label or "no anomaly" label for each of multiple regions. For example, the image of a training instance can be 512 pixels by 512 pixels (or other size), and each ground truth label can include 9 (or other quantity) values, where each of the values can indicate a corresponding likelihood of an anomaly being present in a portion of the image. For instance, the image can be divided into a 3 by 3 grid and each of the values can indicate a corresponding likelihood of an anomaly being present in 1 of the 9 cells of the 3 by 3 grid.

In some implementations, the pose-dependent ML model that corresponds to the given pose can be trained using a plurality of training instances each including an image captured at the given pose and a ground truth label indicating a particular type of anomaly that is present within the image captured at the given pose. In some of those implementations, the aforementioned ML output may indicate whether the area of interest of the liquid tube 102 includes the particular type of anomaly.

In various implementations, based on the ML output, the anomaly detection engine 1052 can determine whether an anomaly is present within a region (e.g., the area of interest)

of the liquid tube 102 captured in the image that is processed by the selected pose-dependent ML model. For example, based on the ML output indicating that there is anomaly present within the captured image, the anomaly detection engine 1052 can determine that the liquid tube 102 includes an anomaly and can cause remediating action(s) to be performed in response. For example, the anomaly detection engine 1052 can generate an alert message, perform or otherwise communicate with other engines/components (not illustrated) to perform one or more additional remediating actions (e.g., display the alert message 107 via the client devices 103-A and/or 103-B, and/or pause an industrial process in which the liquid tube 102 is involved).

Although only a single mobile robot 101 is illustrated in FIG. 1, it is understood that multiple mobile robots can be deployed in an industrial environment and utilized in implementations disclosed herein. For example, each of multiple mobile robots can include a corresponding vision component that is used to capture images, and the images from multiple mobile robots transmitted (along with pose data) to the server device 105 for processing by the ML engine 1051 and the anomaly detection engine 1052. Also, although ML engine 1051, ML model(s) 1053, and anomaly detection engine 1052 is illustrated in FIG. 1 as being implemented separate from the mobile robot 101, in some implementations all or aspects can be implemented by the mobile robot 101. For example, the mobile robot 101 can include the ML engine 1051, the anomaly detection engine 1052, and at least a subset of the ML model(s) 1053. For instance, the mobile robot 101 can include, at a given time, a subset of the ML model(s) 1053 based on that subset corresponding to poses at which the mobile robot 101 will capture images on a mission to be performed by the mobile robot 101 at the given time.

Figure 2:
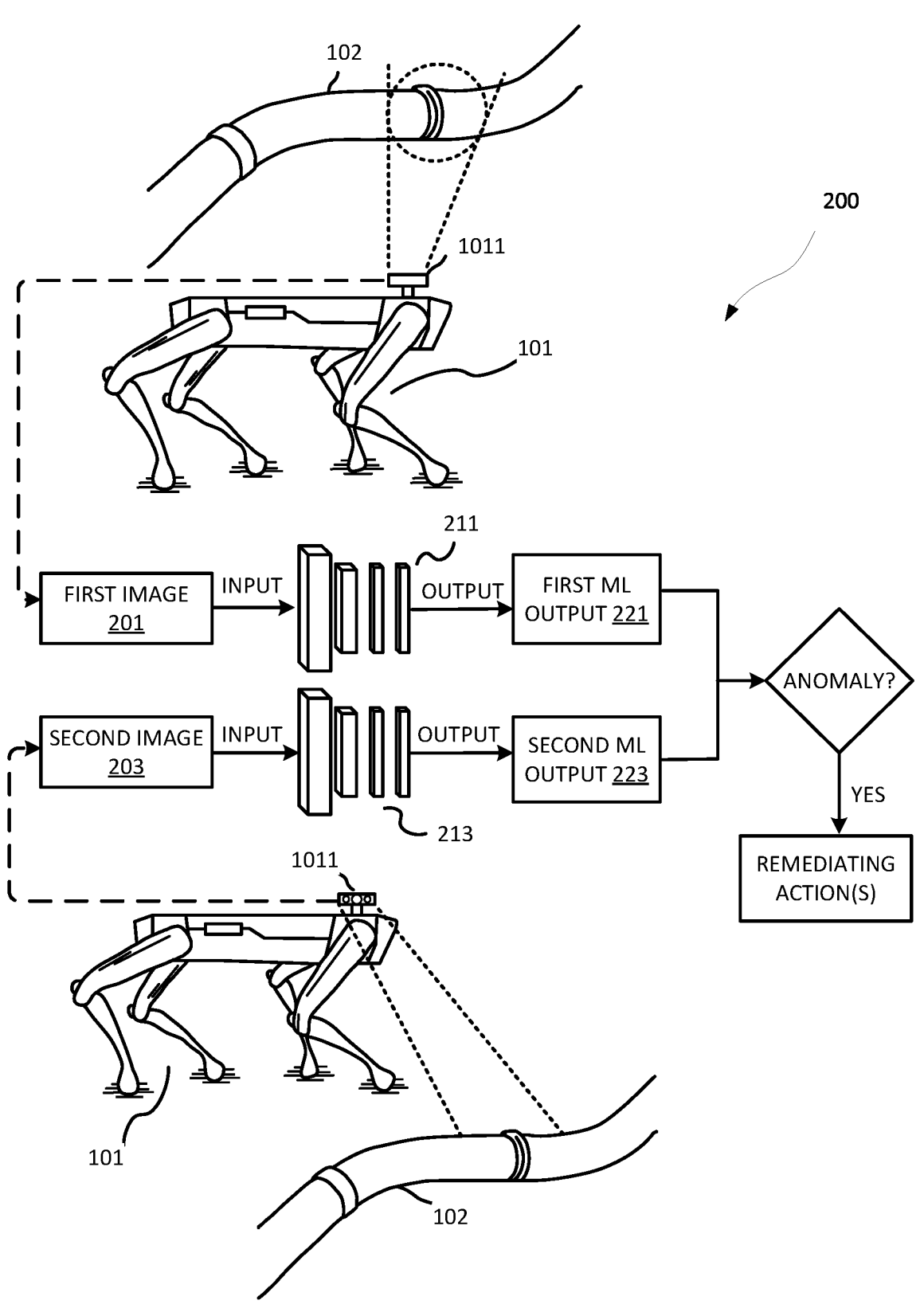
FIG. 2 schematically depicts an example of how techniques described herein can be implemented, in accordance with various implementations.

FIG. 2 schematically depicts an example of how techniques described herein can be implemented, in accordance with various implementations. As shown in FIG. 2, a vision component 1011 of a mobile robot 101 can capture a first image 201 corresponding to a first region (e.g., a first side) of the liquid tube 102 within an industrial facility (sometimes referred to as "industrial automation facility"), where the first image 201 is captured by the vision component 1011 when the vision component 1011 is at a first pose within the environment. The mobile robot can be controlled (e.g., autonomously, optionally based on a previously recorded mission) to move from the first side to another side of the particular component, to allow the vision component 1011 to capture a second image 203, where the second image 203 is captured by the vision component 1011 when the vision component 1011 is at a second pose within the environment, that is distinct from the first pose. The second image 203 can correspond to a second region (e.g., a right side) of the liquid tube 102. In some implementations, the second region can optionally supplement the first region, so that a portion of the liquid tube 102 is captured in its entirety for anomaly detection. In some implementations, the first and second regions can include the same region of the liquid tube 102, but are captured from different vantages (i.e., as a result of being captured from different poses of the vision component 1011).

Responsive to the first image 201 being captured at the first pose, a first ML model 211 can be selected from a plurality of trained ML models. The plurality of trained ML models can be ones trained based on images captured at a range of corresponding poses (e.g., the first pose, the second pose, etc.) for detecting anomalies (crack, leakage, thermal anomaly, corrosion, impurity, etc.) within the industrial facility. The first ML model 211 can be selected based on being trained to process images captured at the first pose, and/or based on a type of anomaly to be detected from the first image 201. Responsive to the second image 203 being captured at the second pose, a second ML model 213 can be selected from the plurality of trained ML models, based on the second ML model 213 being trained to process images captured at the second pose and/or based on a type of anomaly to be detected from the second image 203.

In some implementations, the first image 201 can be determined as being captured at the first pose, based on metadata associated with the first image and received from the mobile robot indicating that the first image is captured at the first pose. In those implementations, selecting the first ML model for processing the first image is responsive to determining, based on the metadata associated with the first image, that the first image is captured at the first pose. In some implementations, the second image can be determined as being captured at the second pose, based on metadata associated with the second image and received from the mobile robot indicating that the second image is captured at the second pose. In those implementations, selecting the second ML model for processing the second image is responsive to determining, based on the metadata associated with the second image, that the second image is captured at the second pose.

The first image 201 can be processed, using the first ML model 211, to generate a first ML output 221 of the first ML model 211. The first ML output 211 can indicate whether there is anomaly present within the first image 201. In some implementations, the first ML output 211 can indicate whether there is a particular type of anomaly present within the first image 201. The second image 203 can be processed, using the second ML model 213 as input, to generate a second ML output 223 of the second ML model 213. The second ML output 223 can indicate whether there is anomaly present within the second image 203. In some implementations, the second ML output 223 can indicate whether there is a particular type of anomaly present within the second image 203.

Based on the first ML output 221 and/or the second ML output 223, whether an anomaly (sometimes a particular type of anomaly) is detected for the particular component can be determined. For example, the first and second regions can be different regions of the one or more particular components, and based on the first ML output 221 indicating an anomaly (e.g., leakage) and the second ML output 223 indicating no anomaly, the anomaly detection engine (e.g., 1052 in FIG. 1) can determine that anomaly is detected for the particular component (at the first region). In this example, the anomaly detection engine and/or other components can perform one or more remediating actions, including but not limited to: generating and delivering an alert message (audibly and/or visually) to one or more client devices of relevant personnel within the industrial facility to schedule maintenance or closer examination, pausing or stopping any process involving the particular component, and/or controlling the mobile robot to capture an additional image with a higher resolution or of a different type (than the first image 201 and the second image 203).

In some implementations, the anomaly detection engine can determine whether an anomaly is detected for the particular component (e.g., determine whether to cause rendering of the alert that indicates the anomaly is present) by: determining whether the first ML output 221 (e.g., value(s) indicating presence of anomaly or not) satisfies a threshold, and determining whether the second ML output 223 ("second output") satisfies the threshold.

In some implementations, the anomaly detection engine can determine to cause rendering of the alert only when both the first output (e.g., 0.8, where a numeric value closer to "1" is more indicative of anomaly being present and a value closer to "0" is less indicative of anomaly) satisfies a threshold (e.g., 0.7) and the second output (e.g., 0.9) satisfies the threshold (0.7). In some implementations, the anomaly detection engine can determine to cause rendering of the alert when the first output (e.g., 0.8) or the second output (e.g., 0.6) satisfies the threshold (e.g., 0.7).

In some implementations, the anomaly detection engine can determine a combined output based on the first output and the second output; and determine, based on the combined output, whether to cause rendering of the alert. In some implementations, the anomaly detection engine can, based on both the first output and the second output, determine a level for the alert to be rendered. For example, when a combined output determined from the first and second output is determined to satisfy a first threshold (e.g., 0.7) but does not satisfy a second threshold (e.g., 0.8), a first type of alert (e.g., a non-urgent alert) can be determined and rendered visually via one or more displays of one or more computing devices within the industrial automation facility. If the combined output is determined to satisfy the second threshold (e.g., 0.8) but does not satisfy a third threshold (e.g., 0.9), a second type of alert (e.g., an urgent alert) can be determined and rendered visually via the one or more displays. If the combined output is determined to satisfy the third threshold (e.g., 0.9), a third type of alert (e.g., an urgent alert) can be determined and rendered visually via the one or more display and a text alert can be delivered to phone numbers of personnel responsible for the particular component. If the combined output is determined to not satisfy the first threshold (e.g., 0.7), no alert is generated nor rendered.

As another example, when the first and second output are each determined to satisfy a first threshold (e.g., 0.7) but not a second threshold (e.g., 0.8), a first type of alert (e.g., a non-urgent alert) can be determined and rendered visually via display(s) of computing device(s) within the industrial automation facility. If the first and second output are each determined to satisfy the second threshold (e.g., 0.8) but not a third threshold (e.g., 0.9), a second type of alert (e.g., an urgent alert) can be determined and rendered via the display(s). If the first and second output are each determined to satisfy the third threshold (e.g., 0.9), a third type of alert (e.g., an urgent alert) can be determined and rendered via the display(s) and/or via additional computing device(s). If either first or the second output fails to satisfy the first threshold (e.g., 0.7), no alert is generated nor rendered.

In some implementations, threshold(s) for the first output, the second output, or the combined output that triggers alert(s) can be different from threshold(s), if any, that trigger a pause of the process(es) involving the particular component for which anomaly is detected. For example, the threshold for the first, second, and/or combined output to trigger the pause of processes involving the particular component can be a numeric value (e.g., 0.95) that is higher than the aforementioned first, second, and/or third thresholds. In other words, in some implementations, only when the combined output (or alternatively, the first and/or second output) satisfies/exceeds the numeric value of approximately 0.95, all processes involving the particular component are paused in response to the combined output satisfying the threshold (e.g., 0.95) for triggering the pause.

The example of FIG. 2 is described with respect to capturing images, of a particular component, from a first pose and a second pose, using a first ML model to process the first pose image and using a second ML model to process the second, and using generated outputs from the processing in determining whether an anomaly is present. However, in various implementations there can be more ML models or only a single ML model utilized in determining whether there is an anomaly associated with a given component. For example, there can be three (or more) ML models each trained for the given component, but each being for a different corresponding pose of a vision component. In such an example: images, of the given component, can be captured from a first pose, second pose, and third pose; a first ML model used to process the first pose image, a second ML model used to process the second pose image, and a third ML model used to process the third pose image; and generated outputs from the processing can be used in determining whether an anomaly is present.

FIG. 3 is a flowchart illustrating an example method 300 of practicing selected aspects of the present disclosure, in accordance with implementations disclosed herein. For convenience, the operations of the flow chart are described with reference to a system that performs the operations. This system can include various components of various computer systems, such as one or more components of the server device 105 (and/or additional computing devices such as the mobile robot 101 or the client device 103-A), including the ML engine 1051 and/or the anomaly detection engine 1052. Moreover, while operations of method 300 are shown in a particular order, this is not meant to be limiting. One or more operations may be reordered, omitted or added.

At block 302A, the system identifies a first image that is captured by a camera of a mobile robot when the camera is at a first pose. At block 302B, the system identifies a second image that is captured by the camera of the mobile robot when the camera is at a second pose that is distinct from the first pose. The first image and the second image both capture one or more particular components of an industrial automation facility, but capture the one or more particular components from different vantages. Optionally, the second image can be captured by an additional mobile robot carrying an additional camera that is the same as, similar to, or different from the camera.

In some implementations, the mobile robot is a wheeled robot, an unmanned aerial vehicle, or a quadruped robot, that is movable within the industrial automation facility. The mobile robot can be controlled, for example, to move along a predefined path, and/or to pause at one or more predefined spots for the camera (or any other vision component as described above) to capture an image at a given pose (e.g., the first or second pose). In some implementations, the camera is fixed with respect to the mobile robot, so that controlling the mobile robot can control or adjust the pose of the camera. In some implementations, the camera is movable (e.g., rotationally and/or translationally) with respect to the mobile robot, while being operably coupled to the mobile robot. In this case, after pausing the mobile robot at the given pose, the camera may be further controlled to capture the image at the given pose (the first or second pose). In some implementations, more than one mobile robot can be deployed within the industrial automation facility to capture one or more images (e.g., in parallel). In some implementations, the camera of the mobile robot is a monographic camera, a stereographic camera, or a thermal camera.

In some implementations, the mobile robot can be controlled to move from a first predefined spot to a second predefined spot, so that the camera can capture the first image at the first pose and further capture the second image at the second pose. In some implementations, the first image and the second image can capture a same area of the one or more particular components, but with different resolutions. In some implementations, the first image and the second image can capture different areas of the one or more particular components. The different areas may, but in some circumstances do not necessarily need to, include an overlapping area. For example, the first image can capture a first portion of the one or more particular components, and the second image can capture a second portion of the one or more particular components that supplements the first portion, so that the one or more particular components are captured in their entirety. In some implementations, the first image and the second image may be, but do not necessarily need to be, of different types.

At block 304A can select a first machine learning (ML) model for processing the first image. The system can select the first ML model responsive to the first image being captured at the first pose and based on the first ML model being trained based on training instances corresponding to the first pose. At block 306A, the system can process the first image, using the selected first ML model, to generate a first output that indicates whether an anomaly is present within the first image.

In some implementations, the first ML model is trained using one or more training instances each including: (1) an image captured by the camera and determined to correspond to the first pose when no anomaly is present for the one or more particular components, and (2) a ground truth label indicating no anomaly is present for the one or more particular components.

At block 304B, the system, e.g., by way of a server such as the server device 105, can select a second ML model for processing the second image, where selecting the second ML model is responsive to the second image being captured at the second pose and the second ML model being trained based on training instances corresponding to the second pose. At block 306B, the system can process the second image, using the selected second ML model, to generate a second output that indicates whether an anomaly is present within the second image.

In some implementations, the second ML model is trained using one or more training instances each including: (1) an image captured by the camera and determined to correspond to the second pose when no anomaly is present for the one or more particular components, and (2) a ground truth label indicating no anomaly is present for the one or more particular components.

At block 308, the system can determine, based on both the first output and the second output, whether to cause rendering of an alert that indicates an anomaly is present for the one or more particular components. In some implementations, the system can determine whether to cause rendering of the alert that indicates the anomaly is present by: determining whether the first output satisfies a threshold; determining whether the second output satisfies the threshold; and determining to cause rendering of the alert if either of the first output or the second output satisfies the threshold.

In some implementations, the system can determine whether to cause rendering of the alert that indicates the anomaly is present by: determining whether the first output satisfies a threshold; determining whether the second output satisfies the threshold; and determining to cause rendering of the alert only when both the first output satisfies the threshold and the second output satisfies the threshold. In some implementations, the system can determine whether to cause rendering of the alert that indicates the anomaly is present by: determining a combined output based on the first output and the second output; and determining, based on the combined output, whether to cause rendering of the alert.

In some implementations, the system can render the alert in response to determining to cause rendering of the alert. The alert can be rendered audibly and/or visually. For example, the alert can be rendered audibly via one or more speakers located within the industrial automation facility. Alternatively or additionally, the alert can be rendered in the form of a message to one or more computing devices within or outside the industrial automation facility. For instance, a desktop of a monitoring room may receive an alert message indicating that anomaly is detected for the one or more particular components, a type of the anomaly, and/or contact information of personnel responsible for the one or more particular components.

Instead of or in addition to determining to cause rendering of the alert, the system can perform one or more other remediating actions. The one or more other remediating actions can include: pausing or stopping one or more industrial processes (e.g., automation processes) involving the one or more particular components for which anomaly is detected. For example, the system can determine, based on both the first output and the second output, to cause pausing of a process, within the industrial automation facility, that involves the one or more particular components.

The method described herein or in other aspects of the present disclosure can be performed via one or more processors of one or more computing devices that are separate from the mobile robot and non-attached to the mobile robot. In this case, the first and second images are transmitted by the mobile robot and identified by the one or more computing devices after being transmitted by the mobile robot.

Figure 4:
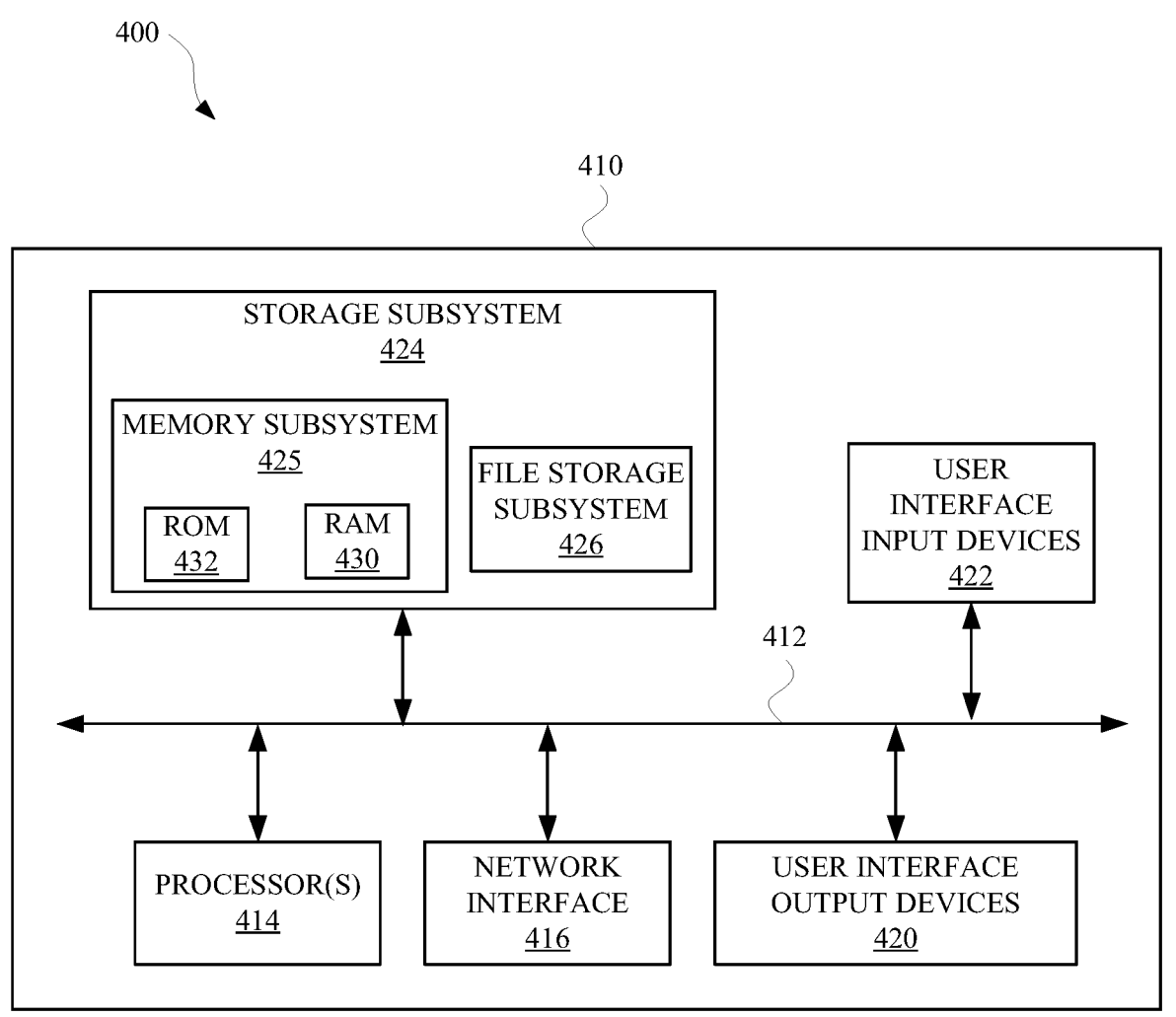
FIG. 4 schematically illustrates an example computer architecture on which selected aspects of the present disclosure may be implemented.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIG. 3, as well as to implement various components depicted in FIGS. 1-2.

These software modules are generally executed by processor 414 alone or in combination with other processors. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented using processor(s) is provided and includes identifying a first image that is captured by a camera of a mobile robot when the camera is at a first pose, and identifying a second image that is captured by the camera of the mobile robot when the camera is at a second pose that is distinct from the first pose. The first image and the second image both capture one or more particular components of an environment of the mobile robot, but capture the one or more particular components from different vantages. The mobile robot can be, for example, a wheeled robot, an unmanned aerial vehicle, or a quadruped robot. The camera of the mobile robot can be, for example, a monographic camera, a stereographic camera, or a thermal camera. The one or more processors can be, for example, of one or more computing devices separate from the mobile robot and non-attached to the mobile robot, and the first and second images can be transmitted by the mobile robot and identified by the computing device after being transmitted by the mobile robot.

In various implementations, the method can further include: selecting a first machine learning (ML) model for processing the first image, where selecting the first ML model is responsive to the first image being captured at the first pose and the first ML model being trained based on training instances corresponding to the first pose. In those implementations, the method can further include: processing the first image, using the selected first ML model, to generate a first output that indicates whether an anomaly (e.g., associated with the one or more particular components of the industrial automation facility) is present.

In various implementations, the method can further include: selecting a second ML model for processing the second image, where selecting the second ML model is responsive to the second image being captured at the second pose and the second ML model being trained based on training instances corresponding to the second pose. In those implementations, the method can further include: processing the second image, using the selected second ML model, to generate a second output that indicates whether an anomaly is present.

In various implementations, the method can further include: determining, based on both the first output and the second output, whether to cause rendering of an alert that indicates an anomaly is present. In some implementations, determining, based on both the first output and the second output, whether to cause rendering of the alert that indicates the anomaly is present can include: determining whether the first output satisfies a threshold; determining whether the second output satisfies the threshold; and determining to cause rendering of the alert if either of the first output or the second output satisfies the threshold. In those or other implementations, the method can further include: rendering the alert in response to determining to cause rendering of the alert.

In some implementations, determining, based on both the first output and the second output, whether to cause rendering of the alert that indicates the anomaly is present can include: determining whether the first output satisfies a threshold; determining whether the second output satisfies the threshold; and determining to cause rendering of the alert only when both the first output satisfies the threshold and the second output satisfies the threshold.

In some implementations, determining, based on both the first output and the second output, whether to cause rendering of the alert that indicates the anomaly is present can include: determining a combined output based on the first output and the second output; and determining, based on the combined output, whether to cause rendering of the alert.

In some implementations, the first ML model is trained using one or more training instances each including: (1) an image captured by the camera and determined to correspond to the first pose when no anomaly, associated with the one or more particular components, is present, and (2) a ground truth label indicating no anomaly, associated with the one or more particular components, is present.

In some implementations, the second ML model is trained using one or more training stances each including: (1) an image captured by the camera, or an additional camera, that correspond to the second pose when no anomaly, associated with the one or more particular components, is present and (2) a ground truth label indicating that no anomaly, associated with the one or more particular components, is present.

In some implementations, instead of or in addition to determining to cause rendering of the alert, the method can include: determining, based on both the first output and the second output, to cause pausing of a process, within the industrial automation facility, that involves the one or more particular components.

In addition, some implementations include one or more processors of a mobile robot and/or of one or more computing devices, where the one or more processors are operable to execute instructions stored in associated memory, and where the instructions are configured to cause performance of any of the methods disclosed herein. Some implementations also include one or more transitory or non-transitory computer readable storage media storing computer instructions executable by one or more processors to perform any of the methods disclosed herein.

In some implementations, a system is provided and includes one or more processors and memory storing instructions that, in response to execution by the one or more processors, cause the one or more processors to: identify a first image that is captured by a camera of a mobile robot when the camera is at a first pose; identify a second image that is captured by the camera of the mobile robot when the camera is at a second pose that is distinct from the first pose; select a first machine learning (ML) model for processing the first image; process the first image, using the selected first ML model, to generate first output that indicates whether an anomaly is present; select a second ML model for processing the second image; process the second image, using the selected second ML model, to generate second output that indicates whether an anomaly is present; and determine, based on both the first output and the second output, whether to cause rendering of an alert that indicates an anomaly is present.

In various implementations, execution of the instructions by the one or more processors cause the one or more processors to further: determine to cause rendering of the alert based on the first output and/or the second output indicating the anomaly, associated with the one or more particular components, is present; and cause rendering of the alert visually and/or audibly. In various implementations, execution of the instructions by the one or more processors cause the one or more processors to further: determine to pause one or more processes within the industrial automation facility that utilizes the one or more particular components; and pause the one or more processes utilizing the one or more particular components.

In some implementations, a mobile robot is provided that includes a camera, memory storing instructions and storing a trained machine learning (ML) model; and one or more processors. The processor(s) are operable to execute the instructions to: receive, from the camera, a first image that is captured when the camera is at a first pose; receive, from the camera, a second image that is captured by the camera of the mobile robot when the camera is at a second pose that is distinct from the first pose; select a first machine learning (ML) model for processing the first image; process the first image, using the selected first ML model, to generate first output that indicates whether an anomaly is present; select a second ML model for processing the second image; process the second image, using the selected second ML model, to generate second output that indicates whether an anomaly is present; and determine, based on both the first output and the second output, whether to cause rendering of an alert that indicates an anomaly is present.

What is claimed is:

1. A method implemented by one or more processors, the method comprising:

identifying a first image that is captured by a camera of a mobile robot when the camera is at a first pose;

identifying a second image that is captured by the camera of the mobile robot when the camera is at a second pose that is distinct from the first pose;

wherein the first image and the second image both capture one or more particular components, but capture the one or more particular components from different vantages;

selecting a first machine learning (ML) model for processing the first image, wherein selecting the first ML model is responsive to the first image being captured at the first pose and the first ML model being trained based on images corresponding to the first pose;

processing the first image, using the selected first ML model, to generate first output that indicates whether an anomaly is present;

selecting a second ML model for processing the second image, wherein the second ML model is trained differently than the first ML model and wherein selecting the second ML model is responsive to the second image being captured at the second pose and the second ML model being trained based on images corresponding to the second pose;

processing the second image, using the selected second ML model, to generate second output that indicates whether an anomaly is present for the one or more particular components;

determining, based on both the first output generated using the selected first ML model and the second output generated using the selected second ML model, whether to cause rendering of an alert that indicates the anomaly is present; and determining, based on both the first output generated using the selected first ML model and the second output generated using the selected second ML model, to cause capturing of an additional image with a higher resolution than the first image and the second image.

2. The method of claim 1, wherein determining, based on both the first output and the second output, whether to cause rendering of the alert that indicates the anomaly is present comprises:

determining whether the first output satisfies a threshold;

determining whether the second output satisfies the threshold; and determining to cause rendering of the alert if either of the first output or the second output satisfies the threshold.

3. The method of claim 1, wherein determining, based on both the first output and the second output, whether to cause rendering of the alert that indicates the anomaly is present comprises:

determining whether the first output satisfies a threshold;

determining whether the second output satisfies the threshold; and determining to cause rendering of the alert only when both the first output satisfies the threshold and the second output satisfies the threshold.

4. The method of claim 1, wherein determining, based on both the first output and the second output, whether to cause rendering of the alert that indicates the anomaly is present comprises:

determining a combined output based on the first output and the second output; and determining, based on the combined output, whether to cause rendering of the alert.

5. The method of claim 1, wherein the mobile robot is a wheeled robot, an unmanned aerial vehicle, or a quadruped robot.

6. The method of claim 1, wherein the camera of the mobile robot is a monographic camera, a stereographic camera, or a thermal camera.

7. The method of claim 1, wherein the first ML model is trained using one or more training instances each including: (1) an image captured by the camera, or an additional camera, corresponding to the first pose when no anomaly associated with the one or more particular components is present, and (2) a ground truth label indicating no anomaly is present associated with the one or more particular components.

8. The method of claim 1, wherein the second ML model is trained using one or more training stances each including: (1) an image captured by the camera, or an additional camera, corresponding to the second pose when no anomaly, associated with the one or more particular components, is present and (2) a ground truth label indicating that no anomaly is present.

9. The method of claim 1, wherein the first image captures a first portion of the one or more particular components, and the second image capture a second portion, of the one or more particular components, that supplements the first portion.

10. The method of claim 1, wherein the first image and second image capture a same region of the one or more particular components.

11. The method of claim 1, further comprising:

rendering the alert in response to determining to cause rendering of the alert.

12. The method of claim 1, further comprising:

determining, based on both the first output and the second output:

to cause pausing of a process, within the environment, that involves the one or more particular components.

13. The method of claim 1, wherein the one or more processors are of one or more computing devices separate from the mobile robot and non-attached to the mobile robot, and wherein the first and second images are transmitted by the mobile robot and identified by the computing device after being transmitted by the mobile robot.

14. A system, comprising:

one or more computing devices at least selectively in network communication with a mobile robot that includes a camera and that is deployed in an environment, wherein the one or more computing devices:

receive, from the mobile robot, a first image that is captured by the camera of the mobile robot when the camera is at a first pose;

receive, from the mobile robot, a second image that is captured by the camera of the mobile robot when the camera is at a second pose that is distinct from the first pose, wherein the first image and the second image both capture the one or more particular components, but capture the one or more particular components from different vantages;

select a first machine learning (ML) model for processing the first image, wherein the second ML model is trained differently than the first ML model and wherein selecting the first ML model is responsive to the first image being captured at the first pose and the first ML model being trained based on images corresponding to the first pose;

process the first image, using the selected first ML model, to generate first output that indicates whether an anomaly is present;

select a second ML model for processing the second image, wherein selecting the second ML model is responsive to the second image being captured at the second pose and the second ML model being trained based on images corresponding to the second pose;

process the second image, using the selected second ML model, to generate second output that indicates whether an anomaly is present;

determine, based on both the first output generated using the selected first ML model and the second output generated using the selected second ML model, whether to cause rendering of an alert that indicates the anomaly is present; and determine, based on both the first output generated using the selected first ML model and the second output generated using the selected second ML model, to cause capturing of an additional image with a higher resolution than the first image and the second image.

15. The system of claim 14, wherein the environment is an industrial automation facility and the one or more computing devices are within the industrial automation facility.

16. The system of claim 14, wherein in determining whether to cause rendering of the alert, the one or more computing devices:

determine whether the first output satisfies a threshold;

determine whether the second output satisfies the threshold; and determine to cause rendering of the alert if either of the first output or the second output satisfies the threshold.

17. The system of claim 14, wherein in determining whether to cause rendering of the alert, the one or more computing devices:

determine whether the first output satisfies a threshold;

determine whether the second output satisfies the threshold; and determine to cause rendering of the alert only when both the first output satisfies the threshold and the second output satisfies the threshold.

18. The system of claim 14, wherein in determining whether to cause rendering of the alert, the one or more computing devices:

determine a combined output based on the first output and the second output; and determine, based on the combined output, whether to cause rendering of the alert.

19. The system of claim 14, wherein the one or more computing devices further:

determine, based on metadata associated with the first image and received from the mobile robot, that the first image is captured at the first pose, wherein selecting the first ML model for processing the first image is responsive to determining that the first image is captured at the first pose.

20. The system of claim 14, wherein the one or more computing devices further:

determine, based on metadata associated with the second image and received from the mobile robot, that the first image is captured at the second pose, wherein selecting the second ML model for processing the second image is responsive to determining that the second image is captured at the second pose.

21. The method of claim 1, wherein the pose of the camera is independently adjustable relative to the robot, and the pose of the camera is a function of the pose of the robot and the pose of the camera relative to the robot.

* * * * *